May 8, 1962
J. M. GRUBER
3,033,031
TILTING PAD TYPE THRUST BEARINGS HAVING INTEGRAL MEANS FOR MEASURING THRUST LOADS
Filed July 27, 1959
3 Sheets-Sheet 1
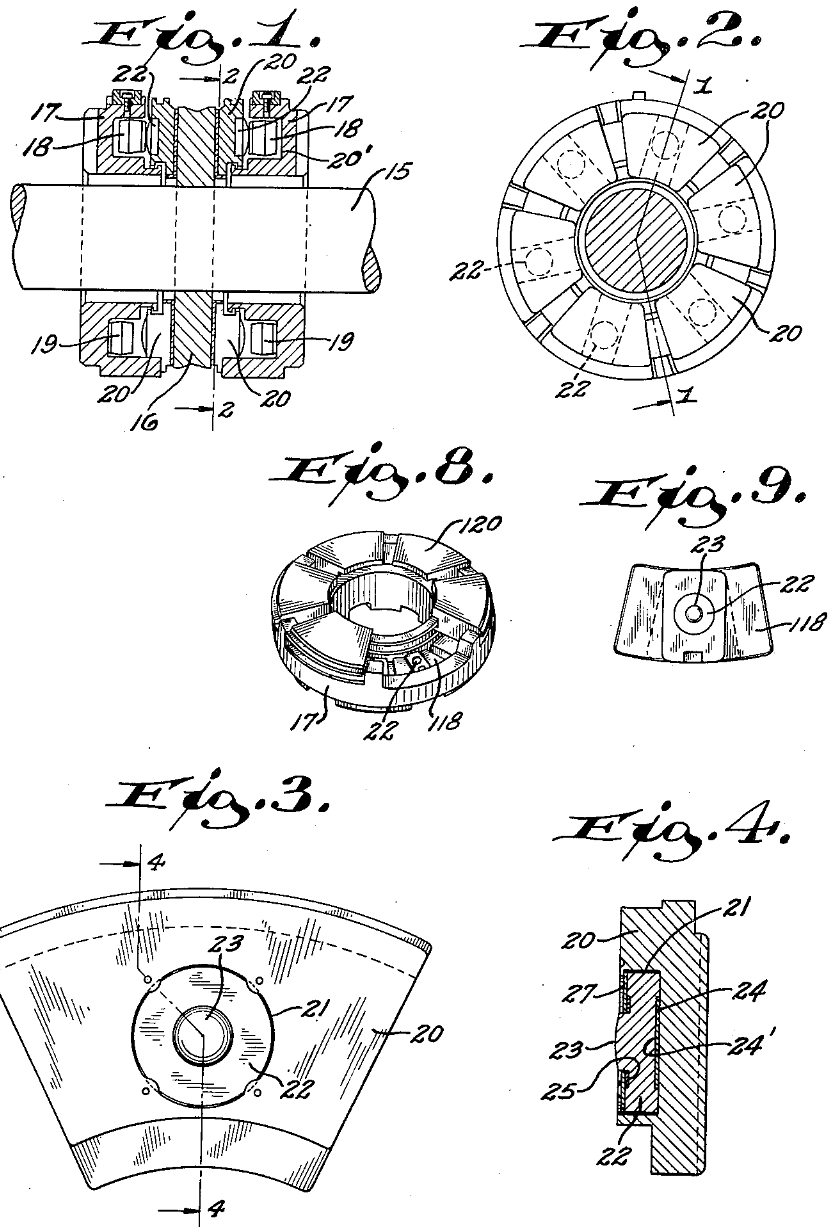
INVENTOR.
Jerome M. Gruber
BY
Morsell & Morsell
ATTORNEYS.

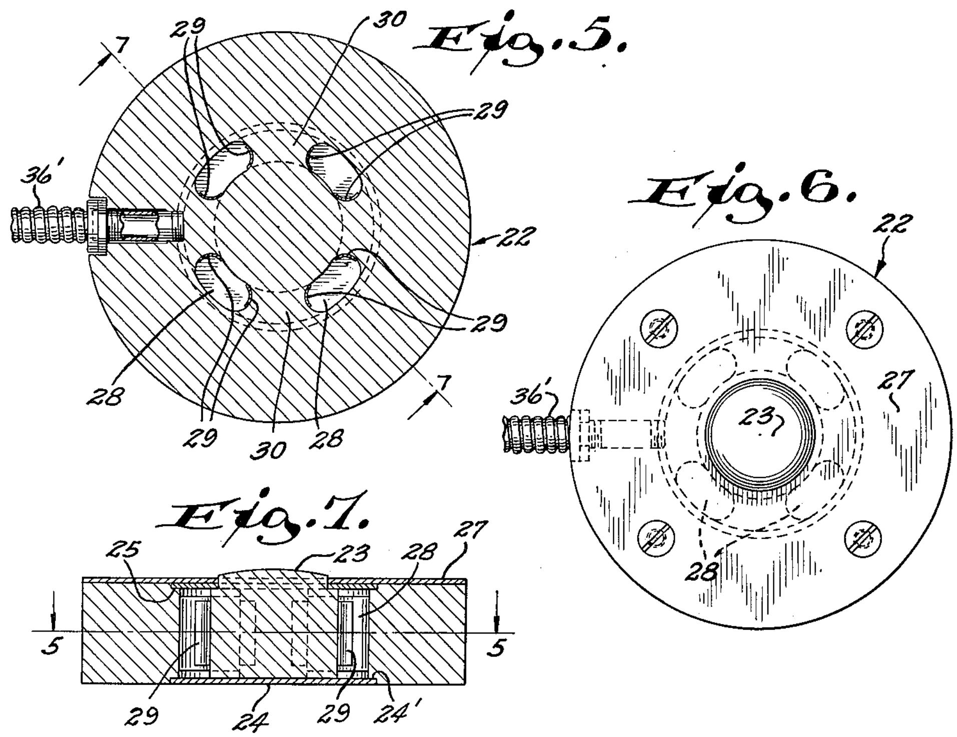
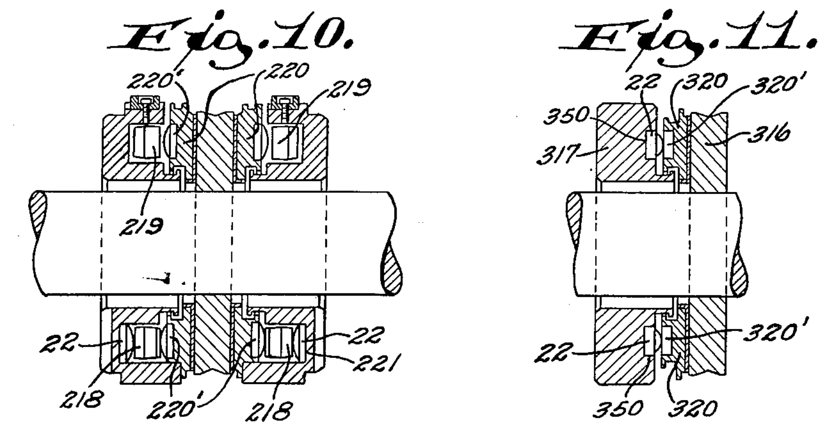
INVENTOR.
Jerome M. Gruber
BY
Morsell & Morsell
ATTORNEYS.

INVENTOR.
Jerome M. Gruber
BY
Morsell & Morsell
ATTORNEYS.

United States Patent Office 3,033,031

Patented May 8, 1962

3,033,031

TILTING PAD TYPE THRUST BEARINGS HAVING INTEGRAL MEANS FOR MEASURING THRUST LOADS

Jerome M. Gruber, Waukesha, Wis., assignor to Waukesha Bearings Corporation, Waukesha, Wis., a corporation of Wisconsin Filed July 27, 1959, Ser. No. 829,744

4 Claims. (Cl. 73—140)

This invention relates to improvements in tilting pad type thrust bearings having integral means for measuring thrust loads.

It is often desirable to make direct measurements of thrust in certain mechanisms, and it is particularly informative to be able to make a direct measurement of the thrust exerted by the propeller of a ship.

Heretofore it has been proposed to temporarily substitute an hydraulic thrust meter for certain parts of a thrust bearing in order to obtain a reading. This involved the use of special parts such as a special plate carrying the hydraulic piston and other mechanism, or a special cage carrying the meter parts, or other complicated mechanism to be temporarily substituted. These prior thrust meters have been very expensive and complicated, and have required time for installation and time for removal.

It is a general object of the present invention to provide a thrust measuring device which is incorporated in standard parts of the thrust bearing so as to be in effect integral therewith, without increasing the size of the thrust bearing components and without requiring special parts to carry the measuring devices.

A further object of the invention is to provide a thrust bearing having means incorporated therein which permits either the taking of individual readings for each pad or shoe, or the taking of an averaged-out reading.

A more specific object of the invention is to provide a thrust bearing having a series of electric load cells permanently incorporated in standard portions of the thrust bearing and electrically connected to a suitable indicator or recorder which is calibrated in units of force.

A further specific object of the invention is to provide a device as above described wherein the electric load cell may perform the dual function of a thrust-bearing support disk and a thrust-measuring load cell.

With the above and other objects in view, the invention consists of the improved thrust bearing having means for measuring thrust loads, and all of its parts and combinations, as set forth in the claims, and all equivalents thereof.

In the accompanying drawings, illustrating several embodiments of the invention, in which the same reference numerals designate the same parts in all of the views:

FIG. 1 is a cross-sectional view through a thrust bearing assembly embodying the present invention, a fragment of the shaft on which the thrust bearing is mounted being shown in full, and the view being taken approximately on line 1—1 of FIG. 2;

FIG. 2 is a sectional view taken on the line 2—2 of FIG. 1;

FIG. 3 is a plan view of a thrust bearing pad or shoe showing a load cell therein;

FIG. 4 is a sectional view taken on line 4—4 of FIG. 3;

FIG. 5 is a sectional view of a load cell taken on line 5—5 of FIG. 7;

FIG. 6 is a plan view of one of the load cells alone;

FIG. 7 is a sectional view taken on the line 7—7 of FIG. 5;

FIG. 8 is a perspective view of part of a thrust bearing assembly with one of the shoes removed to show a modification where a load cell is incorporated in an upper levelling link;

FIG. 9 is a plan view of one of the upper levelling links of FIG. 8;

FIG. 10 is a view similar to FIG. 1 showing another modification where the load cells are embodied in the base ring;

FIG. 11 is a cross-sectional view showing one side only of a nonequalizing thrust bearing showing still another modification, wherein the load cells are embodied in the base ring;

Figure 12:
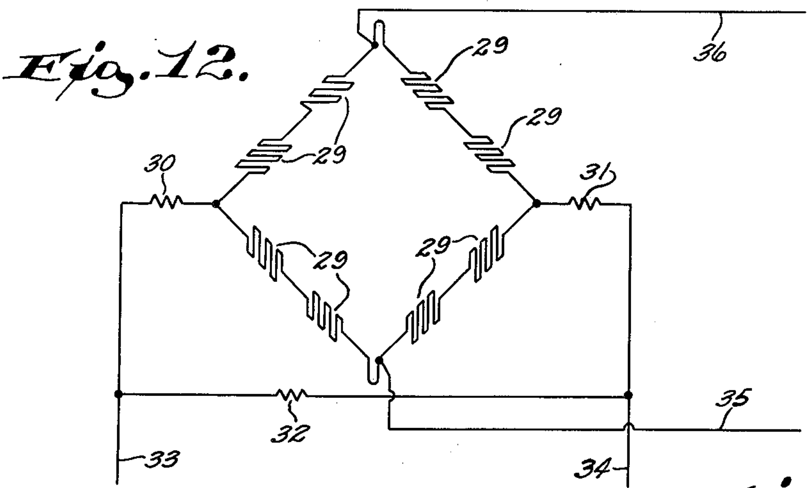
FIG. 12 is a wiring diagram for one of the load cells.

Referring more particularly to the drawings, the numeral 15 designates a shaft which may be the propeller shaft of a ship or other shaft having thrust exerted thereon which is to be measured. The shaft has the usual collar or runner 16 rigid therewith. On each side of the collar is a thrust bearing assembly, each assembly embodying a base ring 17, a set of upper and lower levelling links 18 and 19 respectively, carried in a circular groove 20' of the base ring, and a set of pads or shoes 20. The illustrated embodiment shows a six pad thrust bearing as is clear from FIG. 2. This general type of thrust bearing is well known in the art.

Referring now to FIG. 3 which illustrates one of the removed pads 20, its inner face has a circular recess 21, the same as is customarily employed for the wear resistant button inserts. In the present invention, however, such buttons or support disks in the pads 20 each have an electric load cell 22 embodied therein, each combination support disk and load cell being hereinafter referred to as a load cell and having a projecting convex wear-resistant center 23 which projects beyond the face of the shoe. This cell has its inner side recessed as at 24' to receive a bottom plate 24. On the outer face of the cell, surrounding the center projection 23, is a thin ring-shaped metal diaphragm 25, and positioned over the diaphragm 25 is a ring-shaped protection shield 27. The construction is such as to hermetically seal the cell interior against the oil of the thrust bearing.

Referring now to FIG. 5, immediately surrounding the portion of the cell having the convex projection 23, is a series of generally oval openings 28 (preferably four in number) which extend through from the diaphragm 25 to the plate 24. Cemented at opposite ends of each opening 28 is a strain gauge 29 of a type manufactured by Baldwin, Lima, Hamilton Company, each gauge consisting of a length of fine wire or foil arranged in the form of a grid and bonded to a paper or resin carrier, each strain gauge being cemented to the metal at the end of the recess 28. When thrust loads are transmitted to the central projection 23 of the load cell, strains are set up in the metal webs 30 (FIG. 5). When this occurs, the strain gauges 29 expand or contract slightly.

Referring now to FIG. 12, the six load cells of FIG. 5 are shown diagrammatically and are arranged in a Wheatstone bridge circuit which is initially balanced. In the circuit there is a temperature compensating resistor 30 for compensating for the change in modulus of elasticity of the load cell steel with temperature changes; a resistor 31 for calibrating the cell output to two mv./volt; and a shunt resistor 32 to shunt the input impedance to a nominal 120 ohms. Input voltage lines 33 and 34 lead to opposite corners of the bridge and supply a constant voltage to said opposite corners. Output signal lines 35 and 36 lead from the other two corners and are connected to a suitable indicator as will be hereinafter explained. The bridge circuit is initially balanced. When the wires in the strain gauges 29 are distorted there is a change in the resistance of the wires, thereby unbalancing the bridge circuit. As a result, the output voltage of the bridge through the lines 35 and 36 varies proportionately with the load and the change can be read on the accompanying instrument. The wires 33—36 may be carried out of each load cell by a conduit 36'.

Figure 13:
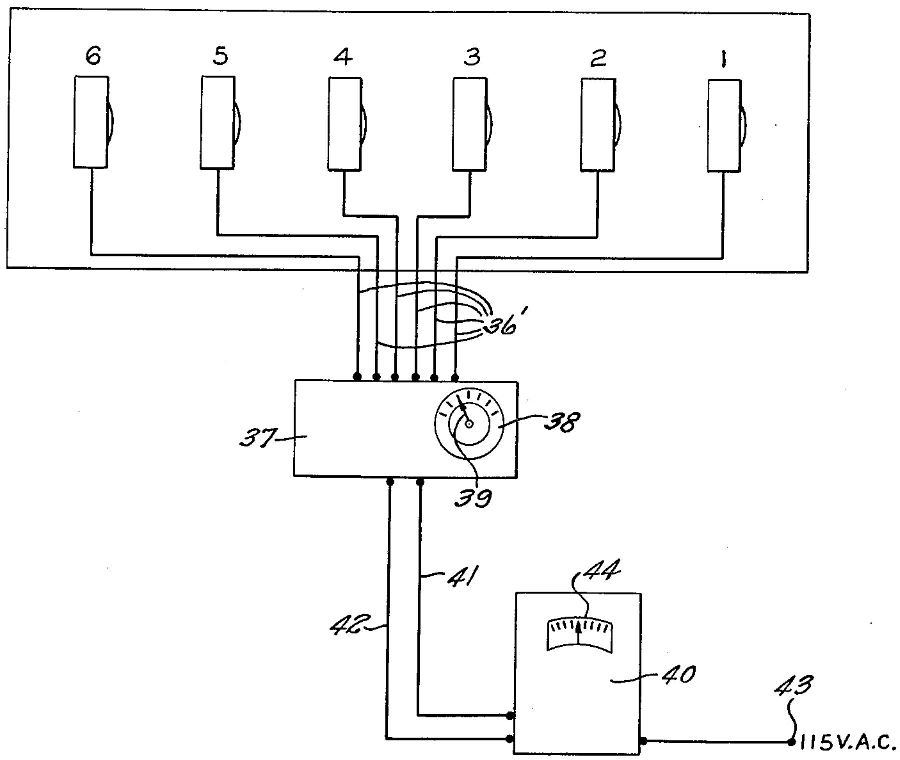
FIG. 13 is a wiring diagram for the entire series of load cells in a six pad thrust bearing.

Referring now to FIG. 13 the numbers 1 to 6 designate the six load cells of FIG. 2, one for each of the six pads. The cable leading from each of the six load cells of FIG. 13 includes all four of the lines 33, 34, 35 and 36. These lines are led into a junction box 37 having a selective switch 38 embodied therein. The switch has seven positions as indicated, one for each of the six load cells, and a seventh for giving an averaged-out reading of all load cells. By moving the switch lever 39 to the position desired, a desired reading may be obtained on the indicator 40. In the position indicated, the lever 39 is in a position to give a reading for the fifth load cell. Leading from the junction box is a six conductor signal cable 41 and a three conductor power cable 42, the latter being suitably connected through the indicator to a 115 volt alternating current source 43. The indicator 40 is calibrated on a scale 44 in terms of the force being measured to give a visual reading. In the position of the parts shown, the indicator will give a reading of the thrust exerted on load cell 5. If the hand 39 on the selector switch is moved to the extreme left-hand position, the indicator 44 will give an averaged-out reading for all of the cells 1 through 6, and hence will give an averaged-out reading of the thrust load on all six pads 20 of FIG. 2.

It is thus apparent that in the form of the invention of FIGS. 1 and 2, a thrust measuring means has been embodied as an integral part of a thrust bearing by merely replacing the wear-resistant buttons normally present in the openings 21 of the shoes with the specially designed load cells 22.

In the form of the invention of FIGS. 8 and 9, the load cells 22 are shown inserted in the upper levelling links 118 so that there is one load cell in a levelling link below each of the shoes 120 of FIG. 8. These load cells of FIGS. 8 and 9 are electrically connected in the same manner shown in FIGS. 12 and 13.

In the form of the invention of FIG. 10, the load cells 22 are shown inserted in circular openings 221 in the base ring, there preferably being one load cell for each shoe in the construction. In this construction, the shoe 220 has its usual wear-resistant button 220'. The load cells 22 of FIG. 10 are wired electrically just as shown in FIGS. 12 and 13.

In FIG. 11 there is illustrated a non-levelling type of thrust bearing wherein the levelling links are not used. In this drawing there is a collar 316 and a base ring 317 and there are pads 320. The pads have wear-resistant inserts 320' and within recesses 350 of the base ring are load cells 22. There may be one load cell below each shoe. The load cells of FIGS. 11 may be electrically wired just as shown in FIGS. 12 and 13.

It is obvious that the number of load cells used in a thrust bearing will vary with the type of bearing and with the number of pads. It is also possible in a six pad bearing to use less than six load cells, for example, three, one for every other pad.

In all forms of the invention it is apparent that the load cells have been incorporated in standard parts of the thrust bearing to in effect be integral therewith and it is apparent that in all forms of the invention it is possible to selectively obtain either an individual reading from each cell, or an averaged-out reading.

It is to be understood that the invention is not to be limited to the exact details of the construction shown and described, for obvious modifications will occur to persons skilled in the art.

What I claim is:

1. In a thrust bearing having a plurality of shoes positioned to receive thrust from a thrust collar on a shaft and having a base ring, a support disk rigid with each shoe, intermediate means for transmitting thrust from said support disks to said base ring, at least some of said support disks being combination support disks and strain gauge type load cells having wear resistant contact surfaces positioned for engagement with said intermediate means, an electric circuit for said combination support disks and load cells, said electric circuit having a portion extending externally from the shoe, each combination support disk and load cell having means therein in said circuit for translating changes of thrust into changes in voltage, and means including an externally accessible indicator in said circuit for giving a reading of the thrust exerted.

2. In a thrust bearing having a plurality of shoes positioned to receive thrust from a thrust collar on a shaft and having a base ring, a support disk rigid with each shoe, intermediate means for transmitting thrust from said support disks to said base ring, at least some of said support disks being combination support disks and load cells and having wear resistant contact surfaces positioned for engagement with said intermediate means, an electric circuit for said combination support disks and load cells, said circuit having a portion extending externally from the shoes, each combination support disk and load cell having means therein in said circuit for translating changes of thrust into changes in voltage, and means including an externally accessible indicator in said circuit for giving a reading of the thrust exerted.

3. In a thrust bearing having a plurality of shoes positioned to receive thrust from a thrust collar on a shaft and having a base ring, a support disk rigidly mounted in each shoe, intermediate means for transmitting thrust from each support disk to said base ring, at least some of said support disks being combination support disks and load cells and having projecting wear resistant contact surfaces positioned for engagement with said intermediate means, an electric circuit for said combination support disks and load cells, said electric circuit having a portion extending externally from the shoes, each combination support disk and load cell having means therein in said circuit for translating changes of thrust into changes in voltage, and means including an externally accessible indicator in said circuit for giving a reading of the thrust exerted.

4. In a thrust bearing having a plurality of shoes positioned to receive thrust from a thrust collar on a shaft, each shoe having a recess therein and said bearing having a base ring, a support disk rigidly mounted in the recess of each shoe, intermediate means for transmitting thrust from each support disk to said base ring, at least some of said support disks being combination support disks and load cells and having wear resistant contact surfaces projecting beyond the shoe for engagement with said intermediate means with the remainder of the support disk being within the confines of the shoe, an electric circuit for said load cells, said circuit having a portion extending externally from the shoes, each combination support disk and load cell having means therein in said circuit for translating changes of thrust into changes in voltage, and means including an externally accessible indicator in said circuit for giving a reading of the thrust exerted.

References Cited in the file of this patent

UNITED STATES PATENTS

| | | |
|---|---|---|
| 1,998,450 | Davis | Apr. 23, 1935 |

FOREIGN PATENTS

| | | |
|---|---|---|
| 656,225 | Germany | Jan. 31, 1938 |
| 964,056 | France | Jan. 18, 1950 |
| 468,238 | Italy | Dec. 29, 1951 |